United States Patent
Boardman et al.

[15] 3,680,151
[45] Aug. 1, 1972

[54] CHAMBER POT

[72] Inventors: Wilfred A. Boardman, 20 Agamemnon Rd., London; David Owen Wills, 31 Milton Lawns, Chesham Bois, Amersham, both of England

[22] Filed: June 18, 1970

[21] Appl. No.: 47,385

[30] Foreign Application Priority Data

Sept. 17, 1969 Great Britain.............45,876/69
Dec. 20, 1969 Great Britain.............62,166/69

[52] U.S. Cl............................................4/141, 4/111
[51] Int. Cl........................A47k 11/02, A47k 11/06
[58] Field of Search..........4/138, 134, 135, 141, 142, 4/1, 111, 110, 116

[56] References Cited

UNITED STATES PATENTS 1,727,842  9/1929  Stallworth........................4/138
3,020,528  2/1962  Swanson, Jr. et al. ........4/141 X
3,268,916  8/1966  Hix, Jr. .............................4/138
3,364,478  1/1938  Waard ..........................4/141 X Primary Examiner—Frederick L. Matteson
Assistant Examiner—Henry K. Artis

[57] ABSTRACT

A chamber pot for infant use comprising a body having a well in the base of its urine receiving chamber, the well being closed at its lower end by a diaphragm electrical contact unit. The diaphragm is flexed by the presence of urine in the well to close its contacts and energize an illuminable stimulus. The illuminable stimulus has an electric lamp housed within a hollow section of the chamber pot. An electric battery is housed between inner and outer side walls of the chamber pot the outer side wall providing the floor support for the chamber pot.

5 Claims, 3 Drawing Figures

PATENTED AUG 1 1972　　　　　　　　　　　　　　　　3,680,151

CHAMBER POT

The invention relates to chamber pots for infant use. The object of our invention is to assist the chamber pot training of infants. This is achieved by establishing and exploiting a psychological response, namely when the infant passes urine in the chamber he is stimulated visually, audibly or tactually or by any combination of these stimuli. By the use of this apparatus the period of chamber pot training may be shortened, the infant quickly relating the passing of urine in the pot to the rewarding stimulus or stimuli. Examples of stimuli producing apparatus, which may be an integral part of the chamber pot or contained in a separate adjacent unit, include the illumination of a smiling face (which may be a real-life or cartoon type image), animated figures, three-dimensional images, three-dimensional figures, plain or mixed colors or any other image which will convey a sense of well-being or reward to the infant. Also the pot could have embodied within its frame a device causing tactile stimulation such as small amplitude high-frequency vibrations in the rim upon which the infant is seated.

Alternatively the pot could have embodied within its frame or adjacent to it a device causing audible stimulation, such as a bell, buzzer, musical device, recorded voice or recorded music, or a combination of these stimuli.

According to our invention a chamber pot has a switch responsive to urine presence in the chamber to effect the operation of the said stimuli.

In further development of the invention the said switch may be a pressure switch, float switch, or any other means of switching.

One form of chamber pot and modification in accordance with the invention will now be described by way of example with reference to the accompanying drawing, in which.

Figure 1:
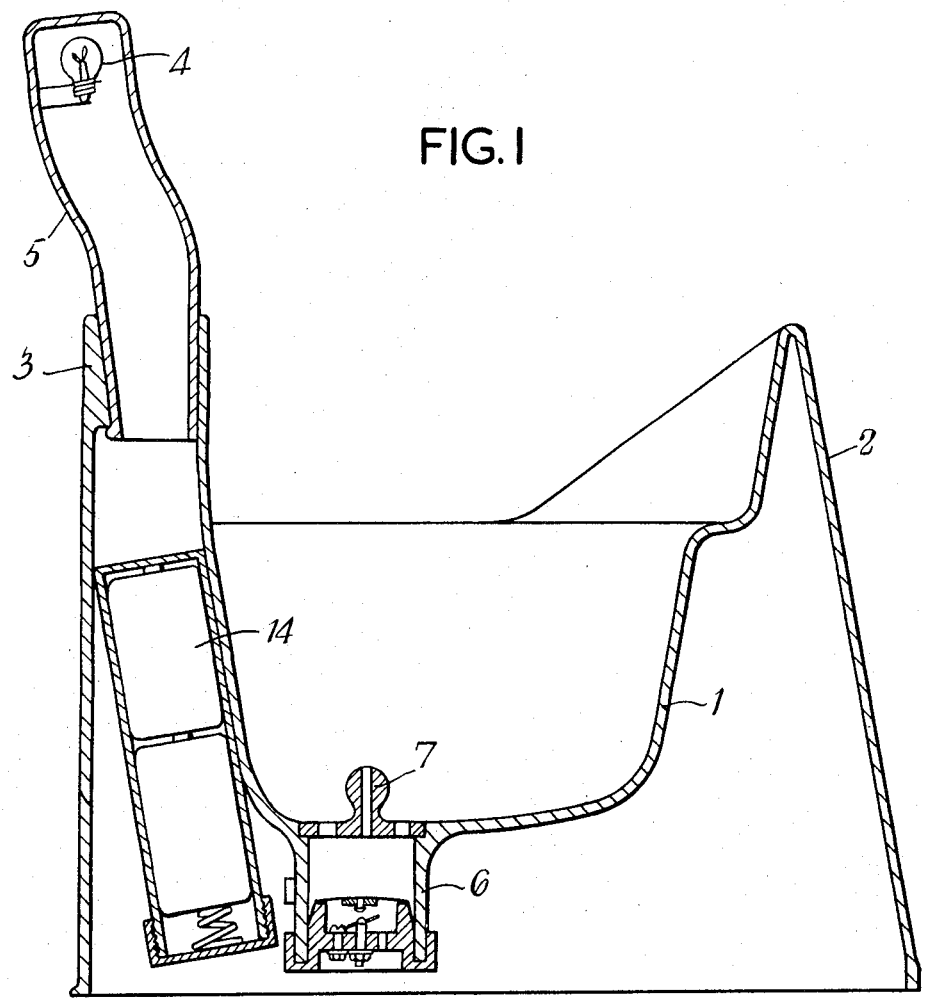
FIG. 1 is a sectional side view of one form of chamber pot.
Figure 2:
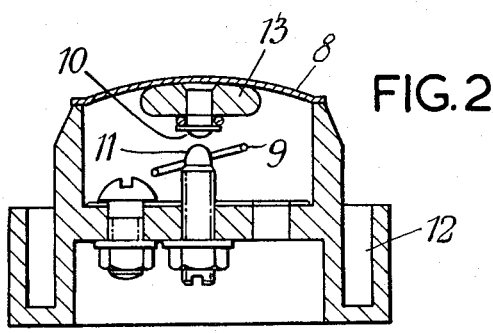
FIG. 2 is an enlarged sectional side view of the prefered means of switching.
Figure 3:
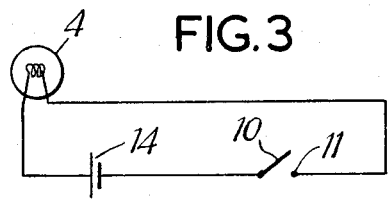
FIG. 3 is a schematic wiring diagram.

With reference to FIG. 1, the chamber pot consists of a vessel upon which the infant is seated, of sufficient size to easily contain any urine deposited therein. It may be constructed from moulded plastics materials, other synthetic or natural material having a base (1) and sides (2), so arranged as to allow clearance between the underside of the base and the bottom edge of the sides when placed upon a level surface. Alternatively, it may consist of a vessel with legs to effect clearance between the base and the level surface. The front of the chamber pot in the example is so formed as to embody an extension limb (3) within which is mounted a light source (4) as a means to illuminate a display screen (5) or toy head, the screen or toy head being in full view of the seated infant. The extension limb may also form a handle for carrying and exptying the chamber pot. The pot base is shaped concave, converse or channelled so that urine will flow towards and into the switching device. The switch used in the example is a direct acting pressure switch mounted in the base of the potty chamber in such a way that urine flowing into the potty is collected and pressure exerted by the weight of that urine. This acts upon a diaphragm thereby causing electrical contacts to close and complete an electrical circuit. With reference to FIG. 2, the switch is mounted in a hollow extension (6) to the potty base which may be made as an integral part of the chamber pot or as a separate item and attached to the base of the chamber during assembly. The said extension is situated towards the front of the chamber in such a position to avoid ingress of solids. At the lower end of the said hollow extension is situated the switch and at the top end, i.e., within the base of the chamber, is a removable drain plug (7) which provides an inlet for urine and prevents any solids from entering the said extension. The drain plug also provides a ready access for cleaning the inside of the said extension, and the possibility of air pressure within preventing urine entering, is avoided by arranging holes in this plug so that urine can enter at a lower level, while air is simultaneously vented at a higher level. The switch consists of a diaphragm (8) together with a spring (9), a moving contact (10) and fixed contact (11) mounted upon a base (12). The switch base has sides which extend above and below the middle section. The diaphragm is stretched across, and attached to, the upper edge of the sides, while the lower edge of the sides are so shaped as to form a liquid tight seal against the lower part of the potty extension. The said switch base could be made from a moulded plastics material as a separate item. The advantage in this form of construction allows the whole switch to be pre-assembled onto its base and fitted into the chamber potty as a final operation. The said diaphragm may be made from a plastics material or natural or synthetic rubber. The purpose of the diaphragm is to both ensure a liquid tight seal for the electrical contacts and also to transmit movement, caused by the weight of urine, to close the contacts. When the diaphragm is so depressed, the movement caused acts against the said spring, which forms part of the circuit and may be spiral in shape to maximize its effective length, and may be made from a conductive metal such as beryllium copper, brass, tinplate, etc. and may be circular or flat in section. On the top end of the spring is mounted the said moving contact and a pad 13, the function of the latter being to minimize the wearing effect of repeated switch operation of the diaphragm. The fixed contact which is mounted on the switch base can be pre-set to achieve the required sensitivity. The current may be carried from the battery (14) to the contacts in the extension by wires which may in the case of a plastics moulded chamber pot and container, be inserted into the moulding at the time of manufacture. Alternatively, other conductive means may be employed for part or all of the circuit described and shown in FIG. 3.

What we claim is:

1. A chamber pot for infant use comprising;
   a. a body having a base and inner side wall portions defining a urine receiving chamber, a downward extension from the base defining a well towards which said base slopes so that urine flows from the base into the well, and an outer side wall portion defining an annular space between it and the inner side wall portion and extending below said base and the lower end of the well to provide by its lower edge a floor standing support for the chamber pot, b. a diaphragm electrical contact unit closing the lower end of the well and having a pair of contacts which close upon downward flexing of the diaphragm caused by urine in the well,
c. a battery housing contained within the annular space,
d. an illuminable stimulus comprising an electric lamp mounted on the chamber pot so that when illuminated it is visible to an infant seated on the chamber pot, and
e. an electric circuit extending within the annular space between the battery housing, the diaphragm electrical contact unit and the stimulus so that closure of said pair of contacts causes illumination of said stimulus.

2. A chamber pot as claimed in claim 1, wherein the electric lamp is housed within a hollow upward extension from said inner and outer side wall portions and opening at it lower end into said annular space.

3. A chamber pot as claimed in claim 1, wherein said diaphragm electric contact unit is a pre-assembled unit which is fitted to close the lower end of said well.

4. A chamber pot as claimed in claim 1, wherein the upper end of the well is closed by a plug which fits flush with said base and which has apertures for the passage of urine.

5. A chamber pot as claimed in claim 4, wherein said plug has a vent hole whose upper end is higher than said base.

* * * * *